(12) United States Patent
Lott

(10) Patent No.: US 10,953,728 B2
(45) Date of Patent: Mar. 23, 2021

(54) PHASE CHANGE MATERIAL HEAT EXCHANGER FOR THREE FLUIDS

(71) Applicant: Eric M Lott, Oxford, MI (US)

(72) Inventor: Eric M Lott, Oxford, MI (US)

(73) Assignee: FCA US LLC, Auburn Hills, MI (US)

( * ) Notice: Subject to any disclaimer, the term of this patent is extended or adjusted under 35 U.S.C. 154(b) by 232 days.

(21) Appl. No.: 16/161,167

(22) Filed: Oct. 16, 2018

(65) Prior Publication Data

US 2020/0114732 A1 Apr. 16, 2020

(51) Int. Cl.
*B60H 1/32* (2006.01)
*B60H 1/00* (2006.01)
*F28D 20/02* (2006.01)
*F28D 20/00* (2006.01)

(52) U.S. Cl.
CPC ......... *B60H 1/321* (2013.01); *B60H 1/00492* (2013.01); *B60H 1/00899* (2013.01); *B60H 1/3227* (2013.01); *B60H 1/3229* (2013.01); *F28D 20/028* (2013.01); *F28D 2020/0008* (2013.01); *F28D 2020/0013* (2013.01)

(58) Field of Classification Search
CPC .. B60H 1/321; B60H 1/00492; B60H 1/0899; B60H 1/3227; B60H 1/3229; F28D 20/02; F28D 20/021; F28D 20/028; F28D 2020/0008; F28D 2020/0013; Y02E 60/145
USPC .......................................................... 165/41
See application file for complete search history.

(56) References Cited

U.S. PATENT DOCUMENTS

| | | | |
|---|---|---|---|
| 5,553,662 A * | 9/1996 | Longardner | F24F 5/0021 165/202 |
| 9,032,939 B2 * | 5/2015 | Glugla | F02D 41/0002 123/563 |
| 9,395,123 B1 * | 7/2016 | Leimkuehler | B64G 1/50 |
| 10,247,144 B2 * | 4/2019 | Keppy | F02M 26/30 |
| 2002/0144806 A1 * | 10/2002 | Gokan | F02B 29/0462 165/157 |
| 2007/0029064 A1 | 2/2007 | Baginski et al. | |
| 2007/0125346 A1 * | 6/2007 | Vetrovec | F02B 33/44 123/563 |
| 2011/0030915 A1 | 2/2011 | Best | |
| 2012/0222846 A1 * | 9/2012 | Kadle | F25B 39/04 165/166 |
| 2018/0031332 A1 | 2/2018 | Altman et al. | |
| 2018/0195741 A1 * | 7/2018 | Field | F24S 60/10 |

\* cited by examiner

*Primary Examiner* — Joel M Attey
(74) *Attorney, Agent, or Firm* — Ralph E Smith

(57) ABSTRACT

A three fluid phase change material (PCM) heat exchanger for a vehicle comprises (i) an intake air channel having a first set of fins disposed therein and configured to receive and output intake air prior to combustion by an engine of the vehicle, (ii) a PCM layer surrounding the intake air channel and configured to cool the intake air, the PCM layer comprising a second set of fins, a PCM fluid that expands when freezing, and a set of elastomeric devices are configured to compress to compensate for the PCM fluid expansion during freezing, and (iii) a refrigerant channel surrounding the PCM layer and configured to circulate a refrigerant to cool the PCM layer to a solid, frozen state.

13 Claims, 2 Drawing Sheets

PHASE CHANGE MATERIAL HEAT EXCHANGER FOR THREE FLUIDS

FIELD

The present application generally relates to vehicle heat exchangers and, more particularly, to a phase change material (PCM) vehicle heat exchanger for three fluids.

BACKGROUND

A heat exchanger is a device used to transfer heat between two or more fluids. For vehicle applications, heat exchangers are often utilized to cool intake air being provided to an engine. Colder air has a higher density, which allows for knock mitigation and reduced spark retard, which in turn allows for more power to be produced by the engine at high loads. One example of a typical vehicle heat exchanger is a radiator. A mixture of antifreeze (e.g., ethylene glycol or propylene glycol) and water (e.g., a 50/50 mixture) is typically utilized as one fluid (the coolant) with the engine intake air being the other fluid. Antifreeze prevents the water from freezing, which would cause the water to expand and potentially damage the heat exchanger or other engine components. The addition of antifreeze to water, however, also lowers its latent heat of fusion, i.e., the amount of energy needed to change the mixture from solid (frozen) to liquid. Accordingly, while these conventional heat exchanger systems work well for their intended purpose, there remains a need for improvement in the relevant art.

SUMMARY

According to one example aspect of the invention, a three fluid phase change material (PCM) heat exchanger for a vehicle is presented. In one exemplary implementation, the heat exchanger comprises (i) an intake air channel having a first set of fins disposed therein and configured to receive and output intake air prior to combustion by an engine of the vehicle, (ii) a PCM layer surrounding the intake air channel and configured to cool the intake air, the PCM layer comprising a second set of fins, a PCM fluid that expands when freezing, and a set of elastomeric devices configured to compress to compensate for the PCM fluid expansion during freezing, and (iii) a refrigerant channel surrounding the PCM layer and configured to circulate a refrigerant to cool the PCM layer to a solid, frozen state.

In some implementations, the set of elastomeric devices are configured to compress to compensate for the PCM fluid expansion during freezing to prevent damage to the heat exchanger. In some implementations, the damage to the heat exchanger is cracking of a housing of the heat exchanger. In some implementations, the PCM fluid is water. In some implementations, the second set of fins, the PCM fluid, and the set of elastomeric devices fully occupy a volume of the PCM layer.

In some implementations, the first and second sets of fins are in thermal contact with each other. In some implementations, the set of elastomeric devices comprises a plurality of elastomeric balls that are evenly spaced throughout the PCM layer. In some implementations, the set of elastomeric devices are attached to the second set of fins. In some implementations, the heat exchanger further comprises a vapor-compression cycle refrigeration system configured to circulate a form of the refrigerant through the refrigerant channel. In some implementations, the refrigerant is R-1234yf.

According to another example aspect of the invention, an engine for a vehicle is presented. In one exemplary implementation, the engine is configured to combust a mixture of intake air and fuel within a plurality of cylinders to generate drive torque, and the engine comprises: an intake manifold that receives the intake air via an intake pipe and distributes the intake air to the plurality of cylinders, a compressor that forces the intake air through the intake pipe, a three fluid phase change material (PCM) heat exchanger disposed along the intake pipe downstream from the compressor and comprising (i) an intake air channel having a first set of fins disposed therein and configured to receive and output the intake air, (ii) a PCM layer surrounding the intake air channel and configured to cool the intake air and comprising a second set of fins, a PCM fluid that expands when freezing, and a set of elastomeric devices configured to compress to compensate for the PCM fluid expansion during freezing, and (iv) a refrigerant channel surrounding the PCM layer and configured to circulate a refrigerant to cool the PCM layer to a solid, frozen state, and a vapor-compression cycle refrigerant system configured to circulate a form of the refrigerant through the refrigerant channel of the heat exchanger.

In some implementations, the set of elastomeric devices are configured to compress to compensate for the PCM fluid expansion during freezing to prevent damage to the heat exchanger. In some implementations, the damage to the heat exchanger is cracking of a housing of the heat exchanger. In some implementations, the PCM fluid is water. In some implementations, the second set of fins, the PCM fluid, and the set of elastomeric devices fully occupy a volume of the PCM layer.

In some implementations, the first and second sets of fins are in thermal contact with each other. In some implementations, the set of elastomeric devices comprises a plurality of elastomeric balls that are evenly spaced throughout the PCM layer. In some implementations, the set of elastomeric devices are attached to the second set of fins. In some implementations, the refrigerant is R-1234yf. In some implementations, the engine further comprises a controller configured to control the engine and the refrigeration system to charge the heat exchanger immediately prior to a drag race of the vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, a mixture of antifreeze and water is typically utilized as a coolant for engine heat exchange.

The addition of antifreeze to water, however, lowers its latent heat of fusion. It would be desirable to utilize water alone as the coolant for engine heat exchange. Water, however, expands when it freezes, which could cause damage (e.g., cracking) of a housing of the heat exchanger. Accordingly, improved three fluid phase change material (PCM) heat exchangers for vehicles are presented. A central air channel having a first set of fins receives and outputs intake air prior to combustion by an engine. A PCM layer surrounds the air channel includes a second set of fins, a set of compressible elastomeric devices (e.g., elastomeric balls), and a PCM fluid (e.g., water) that expands when freezing, and is configured to cool the intake air. Further, a refrigeration channel (e.g., associated with a vapor-compression cycle refrigeration system) surrounds the PCM layer is configured to circulate a refrigerant (e.g., R-1234yf) to cool the PCM layer.

Figure 1:
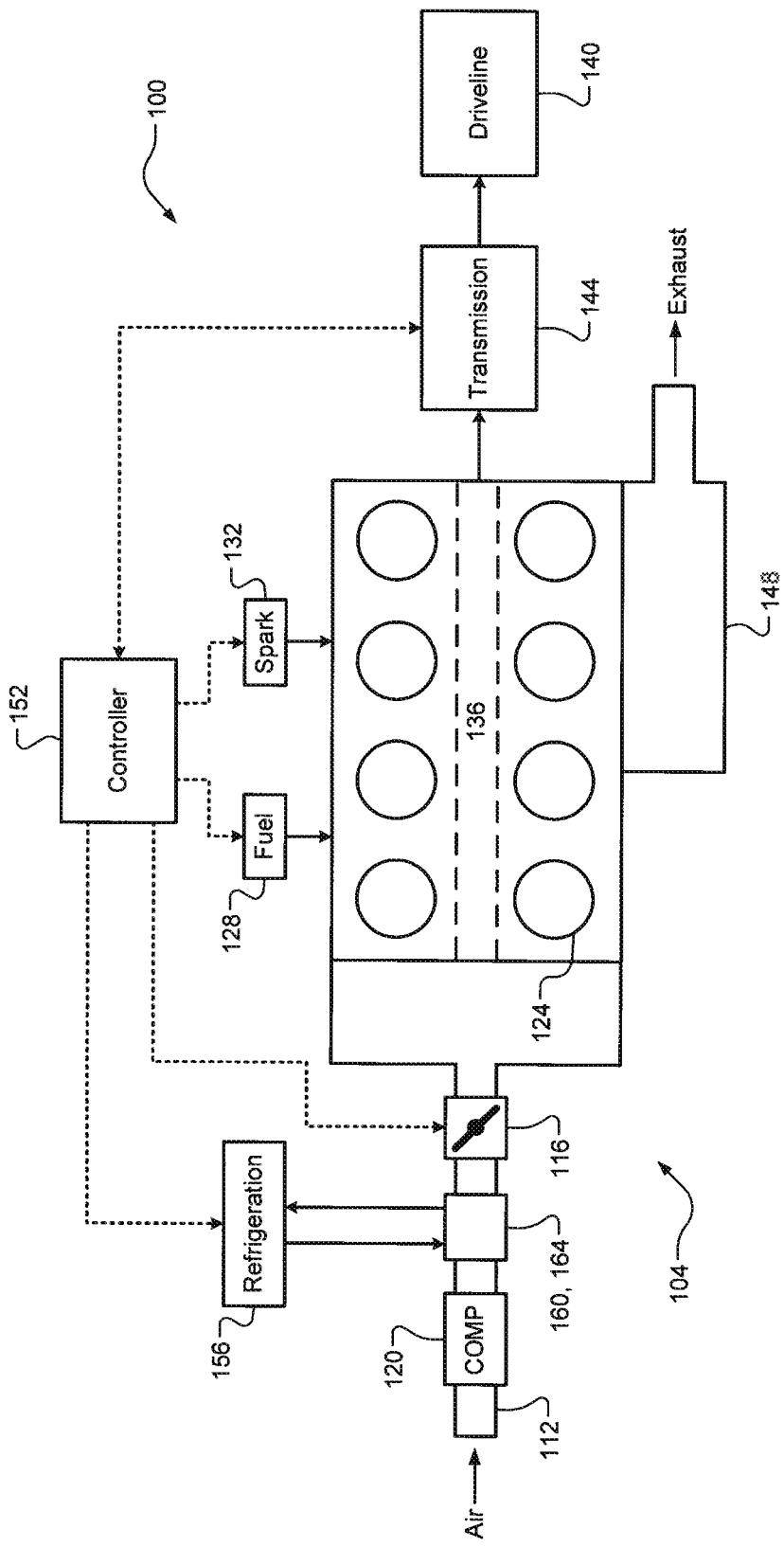
FIG. 1 is a diagram of an example vehicle having a three fluid phase change material (PCM) heat exchanger according to the principles of the present disclosure.

Referring now to FIG. 1, a diagram of an example vehicle 100 is illustrated. The vehicle 100 comprises an engine 104 that draws air into an intake manifold 108 through an intake pipe 112 that is regulated by a throttle valve 116. The engine 104 optionally includes a compressor (COMP) 120 (a supercharger, a turbocharger, etc.) that forces the air into the engine 104 for generation of more drive torque. The air in the intake manifold 108 is distributed to a plurality of cylinders 124 and combined with fuel (e.g., gasoline) from a fuel system 128 to form an air/fuel mixture. While eight cylinders are shown, it will be appreciated that the engine 104 could include any suitable number of cylinders (4, 6, 10, etc.). The air/fuel mixture is compressed by pistons (not shown) within the cylinders 124 and ignited (e.g., by spark from a spark system 132) to drive the pistons and generate drive torque at a crankshaft 136. The drive torque at the crankshaft 136 is transferred to a driveline 140 via a transmission 144. Exhaust gas resulting from combustion is expelled from the cylinders 124 into an exhaust treatment system 148, which treats the exhaust gas to eliminate or mitigate emissions before releasing it into the atmosphere. A controller 152 controls the engine 104 (air, fuel, spark, etc.) and other components, such as a refrigeration system 156.

The vehicle 100 further comprises a three fluid PCM heat exchanger 160 according to the principles of the present disclosure (hereinafter, "heat exchanger 160"). The heat exchanger 160 utilizes three fluids: (1) the intake air, (2) a PCM fluid (e.g., a liquid) that expands when freezing, and (3) a refrigerant. The heat exchanger 160 is associated with the refrigeration system 156 (e.g., a vapor-compression cycle refrigerant system) that circulates the refrigerant through the heat exchanger 160. It will be appreciated that the refrigeration system 156 could include any suitable refrigeration components (compressor, evaporator, etc.). In one exemplary implementation, the refrigerant is R-1234yf (also known as 2,2,3,3-Tetrafluoropropene or HFO-1234yf, having the formula $CH_2\!\!=\!\!CFCF_3$), but it will be appreciated that other suitable refrigerants could be utilized, such as R-134a (1,1,1,2-Tetrafluoroethane). The refrigerant circulates to cool and possibly freeze the PCM fluid, which is capable of expanding without damaging (e.g., cracking) a housing 164 of the heat exchanger 160. The PCM fluid in turn cools the intake air, thereby increasing its density and allowing for the generation of greater drive torque and improved vehicle performance. Specific details of one embodiment of the heat exchanger 160 will now be discussed in greater detail.

Figure 2:
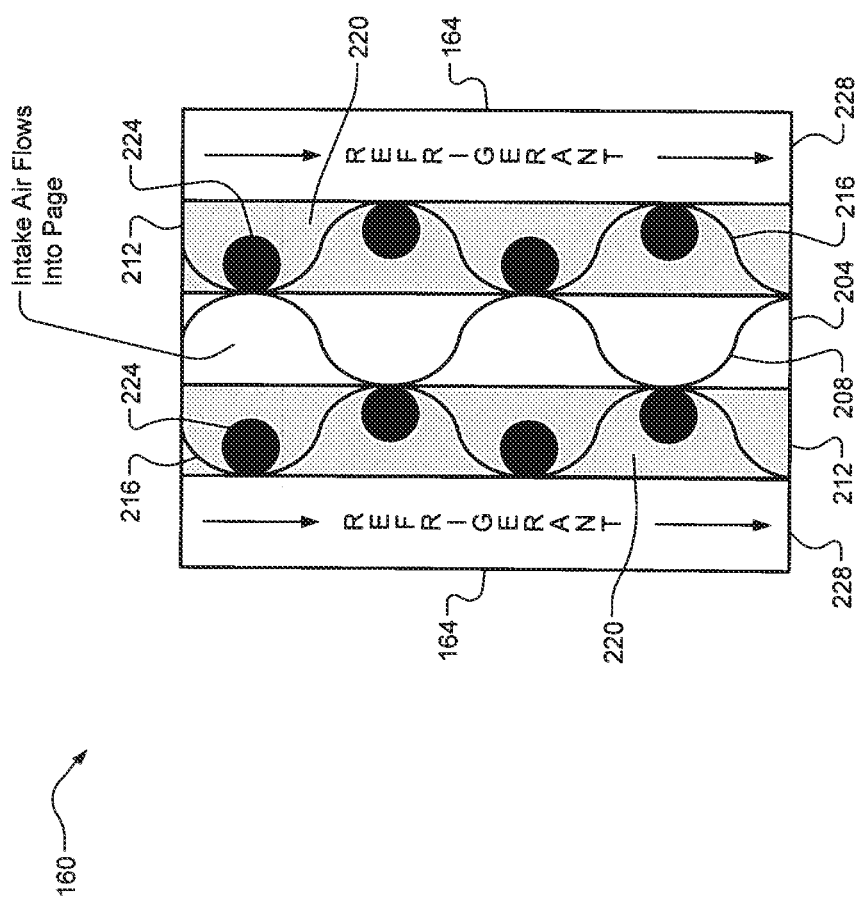
FIG. 2 is a cross-sectional diagram of an exemplary configuration of the three fluid PCM heat exchanger according to the principles of the present disclosure.

Referring now to FIG. 2, a cross-sectional diagram of one example configuration of the heat exchanger 160 is illustrated. The heat exchanger 160 comprises a central intake air channel 204 through which the intake air flows (e.g., along intake pipe 112). Disposed within the air channel 204 is an optional first set of fins 208. While a single sinusoidal first fin is shown, it will be appreciated that other shaped fins and/or multiple fins could be disposed in the intake air channel 204. The first set of fins 208 operate to improve thermal transfer and improve cooling of or heat absorption from the intake air flowing through the intake air channel 204. Surrounding the intake air channel 204 is a PCM layer 212. The PCM layer 212 comprises an optional second set of fins 216, a PCM fluid 220, and a set of elastomeric devices 224. Similar to the first set of fins, while single sinusoidal second fins are shown, it will be appreciated that other shaped and/or multiple fins could be disposed in the PCM layer 212. The second set of fins 216 also operate to improve thermal transfer and improve cooling of or heat absorption. The first and second sets of fins 208, 216 are also in thermal contact or communication with each other such that heat is transferrable therebetween. As previously discussed herein, the PCM fluid 220 could consist of only water, but it will be appreciated that the PCM fluid 220 could be a mixture of water and another fluid such that the mixture still expands when freezing.

As shown, the set of elastomeric devices 224 comprises a plurality of elastomeric balls, but it will be appreciated that other configurations and/or quantities of elastomeric devices could be implemented. In one exemplary implementation, the plurality of elastomeric balls are evenly distributed throughout the PCM layer 212 and, in some implementations, are attached or otherwise affixed to the second set of fins 216 as shown. In one exemplary implementation, the second set of fins 216, the PCM fluid 220, and the set of elastomeric devices 224 fully occupy a volume of the PCM layer 212. The set of elastomeric devices 224 thus operate to compress when the PCM fluid 220 freezes and expands, thereby compensating for the expansion and protecting the heat exchanger 160 from damage, such as cracking of its housing 164. The set of elastomeric devices 224 also do not react with or absorb the PCM fluid 220. The PCM layer 212 is charged (e.g., to a solid, frozen state) by a refrigerant flowing through a refrigerant channel 228 that surrounds the PCM layer 212. This refrigerant channel 228, for example, could circulate a form of a refrigerant (e.g., a liquid and vapor mixture) provided by and recirculated back to the refrigeration system 156. The circulation of the refrigerant operates to cool (e.g., and freeze) the PCM layer 212.

In one exemplary implementation, the heat exchanger 160 is designed such that the PCM layer 212 contains enough PCM fluid 220 (e.g., water) that the heat exchanger 160 is able to absorb a very significant amount of energy. The actual amount of energy, however, would depend on the sizing and the specific configuration of the heat exchanger 160. This large amount of energy could therefore be quickly utilized for high-performance vehicle applications, such as during a short drag race (e.g., less than 10 seconds). In conventional drag racing scenarios, drivers often put bags of ice on top of their engine intake manifolds immediately prior to the drag race, but this provides substantially less cooling energy than the heat exchanger 160 of the present disclosure. Charging the heat exchanger 160 (e.g., freezing the PCM layer 212), however, could take a long period of time (e.g., 10 minutes at idle) and thus could require a lot of energy, thereby decreasing vehicle efficiency and limiting its use to these specific high performance scenarios.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A three fluid phase change material (PCM) heat exchanger for a vehicle, the heat exchanger comprising:
   an intake air channel having a first set of fins disposed therein and configured to receive and output intake air prior to combustion by an engine of the vehicle;
   a PCM layer surrounding the intake air channel and configured to cool the intake air, the PCM layer including:
      a second set of fins,
      a PCM fluid that expands when freezing, and
      a set of elastomeric devices configured to compress to compensate for the PCM fluid expansion during freezing, wherein the set of elastomeric devices comprises a plurality of elastomeric balls that are evenly spaced throughout the PCM layer, and wherein the set of elastomeric devices are attached to the second set of fins; and
   a refrigerant channel surrounding the PCM layer and configured to circulate a refrigerant to cool the PCM layer to a solid, frozen state.

2. The heat exchanger of claim 1, wherein the set of elastomeric devices are configured to compress to compensate for the PCM fluid expansion during freezing to prevent damage to the heat exchanger.

3. The heat exchanger of claim 1, wherein the PCM fluid is water.

4. The heat exchanger of claim 1, wherein the second set of fins, the PCM fluid, and the set of elastomeric devices fully occupy an internal volume of the PCM layer.

5. The heat exchanger of claim 1, wherein the first and second sets of fins are in thermal contact with each other.

6. The heat exchanger of claim 1, further comprising a vapor-compression cycle refrigeration system configured to circulate a form of the refrigerant through the refrigerant channel.

7. The heat exchanger of claim 6, wherein the refrigerant is R-1234yf.

8. An engine for a vehicle, the engine being configured to combust a mixture of intake air and fuel within a plurality of cylinders to generate drive torque, the engine comprising:
   an intake manifold that receives the intake air via an intake pipe and distributes the intake air to the plurality of cylinders;
   a compressor that forces the intake air through the intake pipe;
   a three fluid phase change material (PCM) heat exchanger disposed along the intake pipe downstream from the compressor, the heat exchanger comprising:
      an intake air channel having a first set of fins disposed therein and configured to receive and output the intake air,
      a PCM layer surrounding the intake air channel and configured to cool the intake air, the PCM layer comprising:
         a second set of fins,
         a PCM fluid that expands when freezing, and
         a set of elastomeric devices configured to compress to compensate for the PCM fluid expansion during freezing, wherein the set of elastomeric devices comprises a plurality of elastomeric balls that are evenly spaced throughout the PCM layer, and wherein the set of elastomeric devices are attached to the second set of fins, and
      a refrigerant channel surrounding the PCM layer and configured to circulate a refrigerant to cool the PCM layer to a solid, frozen state; and
   a vapor-compression cycle refrigerant system configured to circulate a form of the refrigerant through the refrigerant channel of the heat exchanger.

9. The engine of claim 8, wherein the set of elastomeric devices are configured to compress to compensate for the PCM fluid expansion during freezing to prevent damage to the heat exchanger.

10. The engine of claim 8, wherein the PCM fluid is water.

11. The engine of claim 8, wherein the second set of fins, the PCM fluid, and the set of elastomeric devices fully occupy a volume of the PCM layer.

12. The engine of claim 8, wherein the first and second sets of fins are in thermal contact with each other.

13. The engine of claim 8, wherein the refrigerant is R-1234yf.

* * * * *